United States Patent
Matsui

(10) Patent No.: US 8,734,884 B2
(45) Date of Patent: May 27, 2014

(54) ROASTED COFFEE BEAN EXTRACT

(75) Inventor: Yuji Matsui, Funabashi (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 13/989,705

(22) PCT Filed: Nov. 22, 2011

(86) PCT No.: PCT/JP2011/076916
§ 371 (c)(1),
(2), (4) Date: May 24, 2013

(87) PCT Pub. No.: WO2012/070578
PCT Pub. Date: May 31, 2012

(65) Prior Publication Data
US 2013/0243929 A1 Sep. 19, 2013

(30) Foreign Application Priority Data
Nov. 24, 2010 (JP) ................................ 2010-261127

(51) Int. Cl.
*A23F 5/06* (2006.01)

(52) U.S. Cl.
USPC .......................................... 426/594; 426/466

(58) Field of Classification Search
USPC .................................. 426/594, 466
See application file for complete search history.

(56) References Cited

U.S. PATENT DOCUMENTS

| | | | | |
|---|---|---|---|---|
| 2,874,629 | A * | 2/1959 | Kahan | 99/298 |
| 3,119,695 | A * | 1/1964 | Kahan | 426/232 |
| 6,054,162 | A | 4/2000 | Bradbury et al. | |
| 7,794,772 | B2 * | 9/2010 | Goto et al. | 426/594 |
| 7,976,887 | B2 * | 7/2011 | Inoue et al. | 426/594 |
| 8,263,149 | B2 * | 9/2012 | Hayakawa et al. | 426/130 |
| 8,282,973 | B2 * | 10/2012 | Shioya et al. | 426/130 |
| 8,318,228 | B2 * | 11/2012 | Shigeno et al. | 426/432 |
| 2008/0166451 | A1 | 7/2008 | Bel-Rhlid et al. | |
| 2008/0260911 | A1 * | 10/2008 | Matsubara et al. | 426/78 |
| 2008/0299283 | A1 * | 12/2008 | Penson et al. | 426/595 |
| 2010/0266726 | A1 * | 10/2010 | Ogura et al. | 426/45 |
| 2010/0285182 | A1 * | 11/2010 | Shioya et al. | 426/106 |
| 2012/0107482 | A1 | 5/2012 | Hayakawa et al. | |

FOREIGN PATENT DOCUMENTS

| | | | |
|---|---|---|---|
| CN | 1813556 | A | 8/2006 |
| CN | 1829444 | A | 9/2006 |
| CN | 1909793 | A | 2/2007 |
| EP | 1374690 | * | 1/2004 |
| EP | 2119368 | * | 11/2009 |
| JP | 10 215771 | | 8/1998 |
| JP | 2008 541712 | | 11/2008 |
| JP | 2009 017825 | | 1/2009 |
| JP | 2009 124951 | | 6/2009 |
| JP | 2009 153451 | | 7/2009 |
| JP | 2009 153452 | | 7/2009 |
| WO | 2008 093892 | | 8/2008 |
| WO | 2008 102892 | | 8/2008 |
| WO | 2010 125770 | | 11/2010 |

OTHER PUBLICATIONS

CoffeeGeek. 2006. http://coffeegeek.com/forums/coffee/machines/203992.*
Farah et al. J. Agric. Food Chem. 2005. vol. 53. pp. 1505-1513.*
International Search Report issued Feb. 28, 2012 in PCT/JP11/076916 filed Nov. 22, 2011.

* cited by examiner

*Primary Examiner* — Anthony Weier
(74) *Attorney, Agent, or Firm* — Oblon, Spivak, McClelland, Maier & Neustadt, L.L.P.

(57) ABSTRACT

Provided is a process for producing a roasted coffee bean extract suppressed in bitterness by selectively reducing the content of chlorogenic acid lactones while maintaining the content of chlorogenic acids and having taste and flavor intrinsic to the roasted coffee bean extract. The process for producing a roasted coffee bean extract includes adjusting a raw-material roasted coffee bean extract so as to have a Brix degree of from 10 to 40 and a pH of from 5.5 to 6.5, and treating the extract with heat at 100° C. or more.

11 Claims, No Drawings

ROASTED COFFEE BEAN EXTRACT

CROSS REFERENCES TO RELATED APPLICATIONS

This application is a 371 of International Patent Application No. PCT/JP11/076,916, filed on Nov. 22, 2011, and claims priority to Japanese Patent Application No. 2010-261127, filed on Nov. 24, 2010.

FIELD OF THE INVENTION

The present invention relates to a process for producing a roasted coffee bean extract.

BACKGROUND OF THE INVENTION

A coffee beverage, which is very popular and favorite drink, is usually produced by blending a roasted coffee bean extract therein. Taste and flavor of a coffee beverage include bitterness, sweetness, acidity, body, rich taste and miscellaneous unpleasant taste or the like. These tastes and flavors are characterized by type of green coffee beans and a roasting method thereof for use in producing a roasted coffee bean extract.

In roasting green coffee beans, many aroma components, which are originally absent in green coffee beans, are produced by a heat treatment. For example, chlorogenic acids are known to be converted into chlorogenic acid lactones at the time of roasting. The chlorogenic acid lactones are substances giving bitterness. Since a threshold of chlorogenic acid lactones is low, one senses strong bitterness even if chlorogenic acid lactones are only slightly present.

Then, to reduce the content of chlorogenic acid lactones giving bitterness various attempts have been made and reported. As a method thereof, for example, Patent Document 1 proposes a method for converting chlorogenic acid lactones to chlorogenic acids by treating a roasted coffee bean extract with alkali; and Patent Document 2 proposes a method for reducing the content of chlorogenic acid lactones by treating a roasted coffee bean extract with an enzyme to hydrolyze the chlorogenic acid lactones or by bringing a roasted coffee bean extract into contact with a solid adsorbent.

CITATION DOCUMENT

Patent Documents

[Patent Document 1] JP-A-10-215771
[Patent Document 2] JP-A-2008-541712

SUMMARY OF THE INVENTION

The present invention is to provide a process for producing a roasted coffee bean extract, including adjusting a raw-material roasted coffee bean extract so as to have a Brix degree of from 10 to 40 and a pH of from 5.5 to 6.5, and subjecting the extract to a heat treatment at 100° C. or more.

The present invention is to also provide a roasted coffee bean extract including the following components (A) and (B):
  chlorogenic acids (A); and
  chlorogenic acid lactones (B),
  wherein a mass ratio [(A)/(B)] of the chlorogenic acids (A) to the chlorogenic acid lactones (B) is from 45 to 100000,
  a content of dicaffeoylquinic acids ($A^1$) in the chlorogenic acids (A) is from 3 to 13 mass and
  a Brix degree is from 10 to 40.

The present invention is to further provide an instant coffee obtained by drying the roasted coffee bean extract, a concentrated coffee composition obtained by concentrating the roasted coffee bean extract and a packaged coffee beverage by charging a container with the roasted coffee bean extract.

EMBODIMENT FOR CARRYING OUT OF THE INVENTION

In the method described in Patent Document 1, it found that though the content of chlorogenic acid lactones can be reduced, the taste and flavor intrinsic to a roasted coffee bean extract is impaired due to alkaline treatment. Furthermore, in the method described in Patent Document 2, it found that though the content of chlorogenic acid lactones can be reduced, the taste and flavor intrinsic to a roasted coffee bean extract is impaired by foreign taste and unusual smell derived from an enzyme and removal of aroma components by a solid adsorbent.

Accordingly, the present invention is directed to providing a roasted coffee bean extract suppressed in bitterness by selectively reducing the content of chlorogenic acid lactones while maintaining the content of chlorogenic acids and taste and flavor intrinsic to the roasted coffee bean extract, and a process for producing the same.

The present invention is also directed to providing an instant coffee, a concentrated coffee composition and a packaged coffee beverage using the roasted coffee bean extract.

The present inventors conducted various studies with a view to solving the aforementioned problems. As a result, they found that a roasted coffee bean extract suppressed in bitterness by selectively reducing the content of chlorogenic acid lactones while maintaining the content of chlorogenic acids and having taste and flavor intrinsic to the roasted coffee bean extract can be obtained by controlling a Brix degree and a pH of a raw-material roasted coffee bean extract so as to fall within predetermined ranges and subjecting the extract to heat treatment under the predetermined conditions.

According to the present invention, it is possible to provide a roasted coffee bean extract suppressed in bitterness by selectively reducing the content of chlorogenic acid lactones while maintaining the content of chlorogenic acids and having taste and flavor intrinsic to the roasted coffee bean extract. Accordingly, the roasted coffee bean extract produced by the process of the present invention, since bitterness is suppressed, is useful as a raw material for an instant coffee, a concentrated coffee composition and a packaged coffee beverage.

First, terms used herein will be described.

The "chlorogenic acid (A)" herein is a general term, which collectively refers to monocaffeoylquinic acids such as 3-caffeoylquinic acid, 4-caffeoylquinic acid and 5-caffeoylquinic acid; monoferuloylquinic acids such as 3-feruloylquinic acid, 4-feruloylquinic acid and 5-feruloylquinic acid; and dicaffeoylquinic acids ($A^1$) such as 3,4-dicaffeoylquinic acid, 3,5-dicaffeoylquinic acid and 4,5-dicaffeoylquinic acid. The "content of chlorogenic acids" is defined as the total amount of the above 9 types. Furthermore, the "content of dicaffeoylquinic acids ($A^1$)" is defined as the total amount of the above 3 types.

The "chlorogenic acid lactone (B)" is a general term, which collectively refers to 3-caffeoylquinic acid lactone, 4-caffeoylquinic acid lactone and 5-caffeoylquinic acid lactone, and the "content of chlorogenic acid lactones (B)" is defined as the total amount of these 3 types.

[Process for Producing Roasted Coffee Bean Extract]

The process for producing a roasted coffee bean extract of the present invention includes adjusting a raw-material roasted coffee bean extract so as to have a Brix degree of from 10 to 40 and a pH of from 5.5 to 6.5, and subjecting the extract to a heat treatment at 100° C. or more.

As the raw-material roasted coffee bean extract, for example, a roasted coffee bean extract extracted from roasted coffee beans and an aqueous solution of instant coffee may be used.

The raw-material roasted coffee bean extract to be used in the present invention preferably uses roasted coffee beans of 1 g or more, more preferably 2.5 g or more, and even more preferably 5 g or more, in terms of green beans, relative to 100 g of the raw-material roasted coffee bean extract.

Examples of the type of coffee beans to be used for extraction include *Coffea Arabica, Coffea Robusta* and *Coffea Liberica*. Furthermore, examples of a production region of coffee beans include, but not particularly limited to, Brazil, Colombia, Tanzania, Mocha, Kilimanjaro, Mandheling and Blue Mountain. These coffee beans may be used singly or as a blend of a plurality of types.

As a roasting method of coffee beans, a known method such as a direct heating system, a hot-air system and a half hot-air system may be appropriately selected. These roasting systems using a rotation drum are preferable. The roasting temperature is not particularly limited, and it is preferably from 100 to 300° C. and more preferably from 150 to 250° C.

As the roast degree of coffee beans, for example, light, cinnamon, medium, high, City, full City, French and Italian are exemplified. Of them, light, cinnamon, medium, high and City are preferred since they contain a large amount of chlorogenic acids and are easily ingested.

The roast degree of measured by a color difference meter is expressed by an L value. The upper limit of the L value is, in view of taste and flavor of the resultant roasted coffee bean extract, preferably 29, more preferably 28, more preferably 27, more preferably 25, and even more preferably 24; whereas the lower limit is preferably 19, more preferably 21 and even more preferably 22. The range of such an L value is preferably from 19 to 29, more preferably from 19 to 28, more preferably from 19 to 27, more preferably from 19 to 25, more preferably from 19 to 24, more preferably from 21 to 25, more preferably from 21 to 24, more preferably from 22 to 25, and even more preferably from 22 to 24. Note that, in the present invention, coffee beans having different roast degrees may be used as a mixture, and coffee beans having an L value outside the above range. In this case, the L value of the entire roasted coffee beans used preferably falls within the above range. Note that if coffee beans having different roast degrees are used, the L value is a sum of values, which is calculated by multiplying the L value of each of the roasted coffee beans by the mass ratio of the roasted coffee beans in the total mass. Furthermore, roasted coffee beans ground may be used.

The "L value" herein is defined as a lightness value of roasted coffee beans measured by a color difference meter, provided that the L value of black is regarded as 0 and the L value of white is regarded as 100. More specifically, L value is an index expressing the roast degree of coffee beans. The higher roast degree of coffee beans, the darker the color of coffee beans and the lower the L value; whereas the lower the roast degree, the higher the L value.

Examples of an extraction method to be employed include, but not particularly limited to, a known method such as a drip system, a continuous multi-tower system, a kneader system and a countercurrent system. Note that, extraction conditions may be appropriately selected depending upon the extraction method.

Examples of an extraction solvent include water, an aqueous solution of alcohol, milk and carbonated water or the like. Of them, in view of taste and flavor, water is preferred. The pH (20° C., hereinafter the same) of the extraction solvent is usually from 4 to 10, and in view of taste and flavor, from 5 to 7 is preferred.

The raw-material roasted coffee bean extract thus obtained is concentrated or diluted with water, as needed, to set a Brix degree (which refers to a refractometer index for sugar, hereinafter the same) to fall within the range of from 10 to 40. In view of maintaining the content of chlorogenic acids and reducing the content of chlorogenic acid lactones, thereby suppressing bitterness, the lower limit of the Brix degree in a raw-material roasted coffee bean extract is preferably set to 13; whereas the upper limit of the Brix degree is preferably set to 35 and more preferably set to 30. The range of the Brix degree is preferably from 10 to 35 and more preferably from 13 to 30. As used herein, the "Brix degree" refers to a value measured by the method described in Examples set forth later.

Furthermore, the pH of a raw-material roasted coffee bean extract is adjusted. The pH of a raw-material roasted coffee bean extract to be used in the present invention is from 5.5 to 6.5. In view of maintaining the content of chlorogenic acids and reducing the content of chlorogenic acid lactones, thereby suppressing bitterness, the upper limit thereof is preferably 6.2 and more preferably 6; whereas, the lower limit is preferably 5.6 and more preferably 5.7. The range of the pH is preferably from 5.6 to 6.2 and more preferably from 5.7 to 6. Note that, the pH may be adjusted by use of an inorganic acid, an organic acid or a salt thereof. More specifically, sodium hydrogen carbonate, L-ascorbic acid and sodium L-ascorbate are exemplified. Of them, in view of easiness in adjusting the taste and flavor and the pH, sodium hydrogen carbonate is preferred.

In the present invention, the raw-material roasted coffee bean extract adjusted in the Brix degree and the pH is subjected to a heat treatment.

The heating temperature is 100° C. or more. In view of maintaining the content of chlorogenic acids and reducing the content of chlorogenic acid lactones, thereby suppressing bitterness, the upper limit is preferably 145° C., more preferably 130° C. and even more preferably 125° C.; whereas, the lower limit is preferably 105° C., more preferably 110° C. and even more preferably 115° C. The range of the heating temperature is preferably from 100 to 145° C., more preferably from 105 to 130° C. and even more preferably from 115 to 125° C.

The treatment time is, in view of maintaining the content of chlorogenic acids and reducing the content of chlorogenic acid lactones, thereby suppressing bitterness, preferably from 1 to 60 minutes, more preferably from 3 to 40 minutes and even more preferably from 5 to 30 minutes.

In the present invention, the heat treatment is preferably performed under pressure. The pressure is not particularly limited as long as it is sufficient to prevent the water content of a roasted coffee bean extract from vaporization. More specifically, the pressure is preferably 400 kPa or less, more preferably 300 kPa or less and even more preferably 290 kPa or less in terms of absolute pressure. The lower limit value is preferably 150 kPa, more preferably 180 kPa and even more preferably 220 kPa. The range of the pressure is preferably from 150 to 400 kPa, more preferably from 180 to 300 kPa and even more preferably from 220 to 290 kPa in terms of absolute pressure. Note that as a method for measuring pressure, for example, measurement by a pressure gauge for measuring internal pressure is mentioned.

As pressurization conditions, a low-oxygen content atmosphere diluted with an inert gas may be employed. Examples of the inert gas include nitrogen, argon and water vapor or the like. Of them, nitrogen is preferred.

An apparatus for applying a heat treatment is not particularly limited and, for example, a pipe-system heat exchanger may be used.

[Roasted Coffee Bean Extract]

Preferred embodiments of a roasted coffee bean extract obtained by the production process of the present invention (hereinafter also simply referred to as "the roasted coffee bean extract of the present invention") will be more specifically described as follows.

The roasted coffee bean extract of the present invention contains chlorogenic acids (A). In view of taste and flavor and physiological effect, the lower limit value is preferably 0.1 mass %, more preferably 0.5 mass % and even more preferably 1 mass % at a Brix degree of from 10 to 40; whereas the upper limit value is preferably 12 mass %, more preferably 10 mass %, more preferably 8 mass %, more preferably 5 mass % and even more preferably 3.5 mass %. The content of the chlorogenic acids (A) is in a range of preferably from 0.1 to 12 mass %, more preferably from 0.5 to 8 mass %, more preferably from 1 to 5 mass % and even more preferably from 1 to 3.5 mass %.

Furthermore, in view of taste and flavor and physiological effect, the lower limit value of the content of chlorogenic acids in solids is preferably 5 mass %, more preferably 8 mass %, more preferably 9 mass % and even more preferably 10 mass %; and the upper limit value of the content is preferably 30 mass %, more preferably 28 mass %, more preferably 25 mass % and even more preferably 15 mass %. The content of chlorogenic acids (A) in solids is in a range of preferably from 5 to 30 mass %, more preferably from 8 to 28 mass %, more preferably from 9 to 28 mass %, more preferably from 10 to 25 mass % and even more preferably from 10 to 15 mass %. As used herein, the "solids" refers to a residue obtained by removing volatile substances from a sample by drying the sample in an electric constant-temperature dryer at 105° C. for 3 hours.

The roasted coffee bean extract of the present invention is rich in chlorogenic acids (A), while the content of chlorogenic acid lactones (B) is reduced. Therefore, the relative ratio of chlorogenic acid lactones (B) to chlorogenic acids (A) present in the extract is low, with the result that bitterness of the roasted coffee bean extract is suppressed.

The mass ratio [(A)/(B)] of the chlorogenic acids (A) to the chlorogenic acid lactones (B) is from 45 to 100000. In view of suppressing bitterness, the mass ratio is preferably from 50 to 10000, more preferably from 63 to 1000 and even more preferably from 100 to 500.

Furthermore, in the roasted coffee bean extract of the present invention, the content of dicaffeoylquinic acids ($A^1$) in chlorogenic acids (A) is from 3 to 13 mass %; and in view of taste balance between acidity and rich taste and physiological effect, the upper limit is preferably 12.5 mass %, more preferably 12 mass %, more preferably 11.5 mass %, more preferably 11 mass %, more preferably 10 mass % and even more preferably 9 mass %; whereas the lower limit is preferably 3.5 mass %, more preferably 4 mass %, more preferably 4.5 mass %, more preferably 5 mass %, more preferably 6 mass % and even more preferably 7 mass %. The range of content of dicaffeoylquinic acids ($A^1$) in chlorogenic acids (A) is preferably from 3.5 to 12.5 mass %, more preferably from 4 to 12 mass %, more preferably from 4.5 to 11.5 mass %, more preferably from 5 to 11 mass %, more preferably from 6 to 10 mass % and even more preferably from 7 to 9 mass %.

The roasted coffee bean extract of the present invention has a Brix degree of from 10 to 40. In view of reducing the content of chlorogenic acid lactones and maintaining the bitterness in a suppressed state, the lower limit value thereof is preferably 13; whereas, the upper limit value is preferably 35, more preferably 31 and even more preferably 30. A range of the Brix degree is preferably from 10 to 35, more preferably from 13 to 31 and even more preferably from 13 to 30.

In the roasted coffee bean extract of the present invention, since the content of chlorogenic acid lactones is reduced, bitterness is suppressed. Furthermore, since the content of chlorogenic acids is rarely reduced even though a heat treatment is applied, physiological effect due to chlorogenic acids can be sufficiently expected.

[Instant Coffee, Concentrated Coffee Composition]

The roasted coffee bean extract of the present invention, since its bitterness is suppressed, is useful for use in an instant coffee and a concentrated coffee composition.

The instant coffee of the present invention may be obtained by drying the roasted coffee bean extract of the present invention. Examples of the drying method include spray drying and freeze drying or the like. As used herein, the "instant coffee" refers to a porous granular concentrated coffee composition having a water content of 3 mass % or less and taken by reconstituting it with a liquid such as water, hot water and milk at ingestion. Examples of form of the instant coffee include a product requiring measurement by a spoon, a package suitable for brewing/infusing and a stick-like package containing a one-cup dose.

Furthermore, the concentrated coffee composition of the present invention may be obtained by concentrating the roasted coffee bean extract of the present invention, and the concentration conditions may be appropriately selected. As used herein, the "concentrated coffee composition" refers to one having a solid content of more than 10 mass % to less than 97 mass %. The form of the concentrated coffee composition may be liquid, gel or slurry. In the case where the concentrated coffee composition is a liquid, e.g., a portion-type dilution beverage may be prepared.

The lower limit value of the content of chlorogenic acids in the solids of the instant coffee and concentrated coffee composition of the present invention is preferably 5 mass %, more preferably 8 mass %, more preferably 9 mass % and even more preferably 10 mass %; the upper limit value of the content is preferably 30 mass %, more preferably 28 mass %, more preferably 25 mass % and even more preferably 15 mass %. The content of chlorogenic acids (A) in the solids is in a range of preferably from 5 to 30 mass %, more preferably from 8 to 28 mass %, more preferably from 9 to 28 mass %, more preferably from 10 to 25 mass % and even more preferably from 10 to 15 mass %.

[Packaged Coffee Beverage]

The packaged coffee beverage of the present invention may be obtained by charging a container with the roasted coffee bean extract of the present invention, if necessary, by diluting it with water. As used herein, the "packaged coffee beverage" refers to one having the solids content of 10 mass % or less.

To the packaged coffee beverage of the present invention, if necessary, additives such as a milk component, a sweetener, a bitterness suppressant, an antioxidant, a flavor, an organic acid, an organic acid salt, an inorganic acid, an inorganic acid salt, an inorganic salt, a pigment, an emulsifier, a preservative, a seasoning, an acidulant, a vitamin, an amino acid, a pH regulator and a quality stabilizer may be added singly or in combination of two or more types.

The packaged coffee beverage of the present invention may be a packaged black coffee beverage or a packaged milk coffee beverage. A packaged black coffee beverage substantially free of a milk component is preferred. Furthermore, the packaged coffee beverage is preferably single strength. The "single strength" used herein refers to a packaged coffee beverage, which can be directly ingested without dilution upon opening the packaged coffee beverage.

In the packaged coffee beverage of the present invention, a Brix degree is preferably from 0.5 to 5, more preferably from 0.8 to 4 and even more preferably from 1 to 3, in view of taste and flavor and suppressing precipitation during long-term storage.

The packaged coffee beverage of the present invention contains chlorogenic acids in an amount of preferably from 0.01 to 8 mass %, more preferably from 0.05 to 6 mass %, more preferably from 0.1 to 4 mass %, more preferably from 0.1 to 2 mass % and even more preferably from 0.1 to 1 mass %, in view of taste and flavor and physiological effect.

The packaged coffee beverage of the present invention has a pH (20° C.) of preferably from 5 to 7, more preferably from 5.4 to 6.5 and even more preferably from 5.6 to 6.3, in view of stability and taste and flavor.

A packaged coffee beverage may be provided as a packaged beverage by filling a conventional package, such as a molded container formed of polyethylene terephthalate as a main component (a so-called PET bottle), a metal can, a paper package in combination with metal foil or a plastic film, and a bottle, with the beverage.

Furthermore, a packaged beverage can be produced, for example, by putting the beverage in a container such as a metal can and, when sterilized with heating is feasible, conducting heat sterilization under the sterilization conditions defined by the corresponding law (the Food Sanitation Act in Japan). In the case of a container such as a PET bottle or a paper container to which retort sterilization cannot be applied, a beverage is previously sterilized for example, at a high temperature for a short time sterilization under the equivalent conditions as aforementioned above, by a plate-type heat exchanger or the like, is cooled to a predetermined temperature, and then is filling in a container. Such a sterilization manner may be employed.

Since the instant coffee, the concentrated coffee composition and the packaged coffee beverage of the present invention are prepared using the roasted coffee bean extract of the present invention as a raw material, the same constitutions as in the above roasted coffee bean extract can be taken with respect to the composition of the roasted coffee bean extract, for example, the content of chlorogenic acids in the solids, a mass ratio [(A)/(B)] and the component ($A^1$) content in component (A).

Preferable embodiments of the present invention will be described as follows.

[1-1] A process for producing a roasted coffee bean extract, comprising adjusting a raw-material roasted coffee bean extract so as to have a Brix degree of from 10 to 40 and a pH of from 5.5 to 6.5, and subjecting the extract to heat treatment at 100° C. or more.

[1-2] The production process according to [1-1] above, wherein the raw-material roasted coffee bean extract is obtained from roasted coffee beans having an L value of preferably from 19 to 29, more preferably from 19 to 28, more preferably from 19 to 27, more preferably from 19 to 25, more preferably from 19 to 24, more preferably from 21 to 25, more preferably from 21 to 24, more preferably from 22 to 25 and even more preferably from 22 to 24.

[1-3] The production process according to [1-1] or [1-2] above, wherein the Brix degree is preferably from 10 to 35 and more preferably from 13 to 30.

[1-4] The production process according to any one of [1-1] to [1-3] above, wherein the pH is preferably from 5.6 to 6.2 and more preferably from 5.7 to 6.

[1-5] The production process according to any one of [1-1] to [1-4] above, wherein a temperature of the heat treatment is preferably from 100 to 145° C., more preferably from 105 to 130° C. and even more preferably from 115 to 125° C.

[1-6] The production process according to any one of [1-1] to [1-5] above, wherein a heating time of the heat treatment is preferably from 1 to 60 minutes, more preferably from 3 to 40 minutes and even more preferably from 5 to 30 minutes.

[1-7] The production process according to any one of [1-1] to [1-6] above, wherein a pressurization condition of the heat treatment is preferably from 150 to 400 kPa, more preferably from 180 to 300 kPa and even more preferably from 220 to 290 kPa in terms of absolute pressure.

[2-1] A roasted coffee bean extract comprising the following components (A) and (B):
chlorogenic acids (A); and
chlorogenic acid lactones (B),
wherein a mass ratio (A)/(B) of the chlorogenic acids (A) to the chlorogenic acid lactones (B) is from 45 to 100000,
a content of dicaffeoylquinic acids ($A^1$) in the chlorogenic acids (A) is from 3 to 13 mass %; and
a Brix degree is from 10 to 40.

[2-2] The roasted coffee bean extract according to [2-1] above, wherein a content of the chlorogenic acids (A) is preferably from 0.1 to 12 mass %, more preferably from 0.5 to 8 mass %, more preferably from 1 to 5 mass % and even more preferably from 1 to 3.5 mass %.

[2-3] The roasted coffee bean extract according to [2-1] or [2-2] above, wherein a content of the chlorogenic acids (A) in solids is preferably from 5 to 30 mass %, more preferably from 8 to 28 mass %, more preferably from 9 to 28 mass %, more preferably from 10 to 25 mass % and even more preferably from 10 to 15 mass %.

[2-4] The roasted coffee bean extract according to any one of [2-1] to [2-3] above, wherein the mass ratio (A)/(B) is preferably from 50 to 10000, more preferably from 63 to 1000 and even more preferably from 100 to 500.

[2-5] The roasted coffee bean extract according to any one of [2-1] to [2-4] above, wherein the content of dicaffeoylquinic acids ($A^1$) in the chlorogenic acids (A) is preferably from 3.5 to 12.5 mass %, more preferably from 4 to 12 mass %, more preferably from 4.5 to 11.5 mass %, more preferably from 5 to 11 mass %, more preferably from 6 to 10 mass and even more preferably from 7 to 9 mass %.

[2-6] The roasted coffee bean extract according to any one of [2-1] to [2-5] above, wherein the Brix degree is preferably from 10 to 35, more preferably from 13 to 31 and even more preferably from 13 to 30.

[2-7] The roasted coffee bean extract according to any one of [2-1] to [2-6] above, obtained by the production process according to any one of [1-1] to [1-7] above.

[3-1] An instant coffee obtained by drying the roasted coffee bean extract according to any one of [2-1] to [2-7] above.

[3-2] The instant coffee according to [3-1] above, wherein a content of the chlorogenic acids (A) in solids is preferably from 5 to 30 mass %, more preferably from 8 to 28 mass %, more preferably from 9 to 28 mass %, more preferably from 10 to 25 mass % and even more preferably from 10 to 15 mass %.

[3-3] The instant coffee according to [3-1] or [3-2] above, wherein the mass ratio (A)/(B) of the chlorogenic acids (A) to the chlorogenic acid lactones (B) is from 45 to 100000, preferably from 50 to 10000, more preferably from 63 to 1000 and even more preferably from 100 to 500.

[3-4] The instant coffee according to any one of [3-1] to [3-3] above, wherein the content of dicaffeoylquinic acids ($A^1$) in the chlorogenic acids (A) is from 3 to 13 mass %, preferably from 3.5 to 12.5 mass %, more preferably from 4 to 12 mass %, more preferably from 4.5 to 11.5 mass %, more preferably from 5 to 11 mass %, more preferably from 6 to 10 mass % and even more preferably from 7 to 9 mass %.

[3-5] The instant coffee according to any one of [3-1] to [3-4] above, wherein a water content is 3 mass % or less.

[3-6] The instant coffee according to any one of [3-1] to [3-5] above, wherein the drying is spray drying or freeze drying.

[4-1] A concentrated coffee composition obtained by concentrating the roasted coffee bean extract according to any one of [2-1] to [2-7] above.

[4-2] The concentrated coffee composition according to [4-1] above, wherein the content of the chlorogenic acids (A) in solids is preferably from 5 to 30 mass %, more preferably from 8 to 28 mass %, more preferably from 9 to 28 mass %, more preferably from 10 to 25 mass % and even more preferably from 10 to 15 mass %.

[4-3] The concentrated coffee composition according to [4-1] or [4-2] above, wherein the mass ratio (A)/(B) of the chlorogenic acids (A) to the chlorogenic acid lactones (B) is from 45 to 100000, preferably from 50 to 10000, more preferably from 63 to 1000 and even more preferably from 100 to 500.

[4-4] The concentrated coffee composition according to any one of [4-1] to [4-3] above, wherein the content of dicaffeoylquinic acids ($A^1$) in the chlorogenic acids (A) is from 3 to 13 mass %, preferably from 3.5 to 12.5 mass %, more preferably from 4 to 12 mass %, more preferably from 4.5 to 11.5 mass %, more preferably from 5 to 11 mass %, more preferably from 6 to 10 mass % and even more preferably from 7 to 9 mass %.

[4-5] The concentrated coffee composition according to any one of [4-1] to [4-4] above, wherein the solid content is more than 10 mass % to less than 97 mass %.

[5-1] A packaged coffee beverage obtained by charging a container with the roasted coffee bean extract according any one of [2-1] to [2-7] above.

[5-2] The packaged coffee beverage according to [5-1] above, wherein the content of the chlorogenic acids (A) is preferably from 0.01 to 8 mass %, more preferably from 0.05 to 6 mass %, more preferably from 0.1 to 4 mass %, more preferably from 0.1 to 2 mass % and even more preferably from 0.1 to 1 mass %.

[5-3] The packaged coffee beverage according to [5-1] or [5-2] above, wherein the pH is preferably from 5 to 7, more preferably from 5.4 to 6.5 and even more preferably from 5.6 to 6.3.

[5-4] The packaged coffee beverage according to any one of [5-1] to [5-3] above, wherein the content of the chlorogenic acids (A) in solids is preferably from 5 to 30 mass %, more preferably from 8 to 28 mass %, more preferably from 9 to 28 mass %, more preferably from 10 to 25 mass % and even more preferably from 10 to 15 mass %.

[5-5] The packaged coffee beverage according to any one of [5-1] to [5-4] above, wherein the Brix degree is preferably from 0.5 to 5, more preferably from 0.8 to 4 and even more preferably from 1 to 3.

[5-6] The packaged coffee beverage according to any one of [5-1] to [5-5] above, wherein the mass ratio (A)/(B) of the chlorogenic acids (A) to the chlorogenic acid lactones (B) is from 45 to 100000, preferably from 50 to 10000, more preferably from 63 to 1000 and even more preferably from 100 to 500.

[5-7] The packaged coffee beverage according to any one of [5-1] to [5-6] above, wherein the content of dicaffeoylquinic acids ($A^1$) in the chlorogenic acids (A) is from 3 to 13 mass %, preferably from 3.5 to 12.5 mass %, more preferably from 4 to 12 mass %, more preferably from 4.5 to 11.5 mass %, more preferably from 5 to 11 mass %, more preferably from 6 to 10 mass % and even more preferably from 7 to 9 mass %.

[5-8] The packaged coffee beverage according to any one of [5-1] to [5-7] above, wherein the solid content is 10 mass % or less.

EXAMPLES

1. Analysis of Chlorogenic Acids

HPLC was used as an analyzer. The model numbers of component units in the analyzer are as follows:
UV-VIS detector: L-2420 (Hitachi High-Technologies Corporation),
Column oven: L-2300 (Hitachi High-Technologies Corporation),
Pump: L-2130 (Hitachi High-Technologies Corporation),
Auto sampler: L-2200 (Hitachi High-Technologies Corporation),
Column: Cadenza CD-C18, 4.6 mm (inner diameter)×150 mm (length), particle size: 3 μm (Imtakt Corp.)
Analytical conditions are as follows.
Sample injection volume: 10 μL,
Flow rate: 1.0 mL/min,
Predetermined wavelength of UV-VIS detector: 325 nm,
Predetermined temperature of column oven: 35° C.,
Eluent A: 5 (v/v) % acetonitrile solution containing 0.05M acetic acid, 0.1 mM 1-hydroxyethane-1,1-diphosphonic acid (HEDPO) and 10 mM sodium acetate,
Eluent B: Acetonitrile.
Concentration Gradient Conditions

| Time | Eluent A | Eluent B |
|---|---|---|
| 0.0 min. | 100% | 0% |
| 10.0 min. | 100% | 0% |
| 15.0 min. | 95% | 5% |
| 20.0 min. | 95% | 5% |
| 22.0 min. | 92% | 8% |
| 50.0 min. | 92% | 8% |
| 52.0 min. | 10% | 90% |
| 60.0 min. | 10% | 90% |
| 60.1 min. | 100% | 0% |
| 70.0 min. | 100% | 0% |

In HPLC, a coffee extract's volume was increased to 10 mL, filtrated by a membrane filter (GL CHROMATODISK 25A, pore size 0.45 μm, GL Sciences Inc.) and then subjected to analysis.
Retention time of chlorogenic acids (unit: minute)
Monocaffeoylquinic acid: 3 peaks at 5.3, 8.8, 11.6, Monoferuloylquinic acid: 3 peaks at 13.0, 19.9, 21.0,
Dicaffeoylquinic acid($A^1$): 3 peaks at 36.6, 37.4, 44.2.

From the area values of the nine types of chlorogenic acids as obtained herein, the content of chlorogenic acids (g/100 g) was obtained with 5-caffeoylquinic acid used as a standard substance.

2. Analysis of Chlorogenic Acid Lactones

Analysis was performed by using the same analyzer and analysis conditions as used in analysis for chlorogenic acids Retention time of chlorogenic acid lactones (unit: minute)

(B) Caffeoylquinic acid lactone: 3 peaks at 26.8, 28.2, 30.6.

From the area values of the three types of chlorogenic acid lactones as obtained herein, the content of chlorogenic acid lactones (g/100 g) was obtained with 5-caffeoylquinic acid used as a standard substance.

3. Measurement of Brix Degree

A Brix degree of the sample was measured at 20° C. by a saccharimeter (Atago RX-5000, manufactured by Atago Co., Ltd.).

4. Measurement of L Value

A sample was measured by a color difference meter (SPECTROPHOTOMETER SE2000, manufactured by Nippon Denshoku Industries Co., Ltd.).

5. Sensory Evaluation

Roasted coffee bean extracts obtained in Examples and Comparative Examples were adjusted so as to have a Brix degree of 2, and evaluated for bitterness, deterioration smell and balance between acidity and rich taste by 3 expert panels based on the following criteria. A final score was determined based on the average value of them. Note that, "deterioration smell" was evaluated in the view point whether taste and flavor intrinsic to the roasted coffee bean extract is impaired or not.

Evaluation criteria (bitterness and deterioration smell)
 4: Weak
 3: Slightly weak
 2: Slightly strong
 1: Strong Evaluation criteria (taste balance between acidity and rich taste)
 5: Very good
 4: Good
 3: Slightly good
 2: Bad
 1: Very bad

Production Example 1

Production of Raw-Material Roasted Coffee Bean Extract (1)

To a columnar extractor with a metal mesh, Columbia beans (0.4 kg) having a roast degree of L22 were loaded, and 700 mL of ion exchange water (pH 5.7) at 95° C. was passed through the beans to obtain a raw-material roasted coffee bean extract (1) having a Brix degree of 15. The extract had a pH of 4.6 and contained chlorogenic acids (A) in an amount of 1335 mg/100 mL, chlorogenic acid lactones (B) in an amount of 45 mg/100 mL and dicaffeoylquinic acids ($A^1$) in (A) in an amount of 4.9 mass %.

Production Example 2

Production of Raw-Material Roasted Coffee Bean Extract (2)

To a columnar extractor with a metal mesh, a 50/50 blend (0.4 kg) of beans having a roast degree of L16.5 and beans having a roast degree of L30 was loaded, and 700 mL of ion exchange water (pH 5.7) at 95° C. was passed through the beans to obtain a coffee extract having a Brix degree of 15. The obtained extract was concentrated by a condenser to a Brix degree of 32 to obtain a raw-material roasted coffee bean extract (2). The resultant extract had a pH of 5.3 and contained chlorogenic acids in an amount of 3672 mg/100 mL, chlorogenic acid lactones in an amount of 77 mg/100 mL and dicaffeoylquinic acids ($A^1$) in (A) in an amount of 9.6 mass %.

Examples 1 to 6 and Comparative Examples 1 to 3

Raw-material roasted coffee bean extracts (100 mL) shown in Table 1 were used. A Brix degree was adjusted with ion exchange water and a pH was adjusted with a 10% sodium hydrogen carbonate (pH was not adjusted in Comparative Example 1) and then the extracts were treated in heating and pressurization conditions shown in Table 1 to obtain roasted coffee bean extracts. Analysis results of the resultant roasted coffee bean extracts are shown in Table 1.

Production Example 3

Production of Raw-Material Roasted Coffee Bean Extract (3)

To a columnar extractor with a metal mesh, Columbia beans (0.4 kg) having a roast degree of L16.5 were loaded, and 600 mL of ion exchange water (pH 5.7) at 95° C. was passed through the beans to obtain a raw-material roasted coffee bean extract (3) having a Brix degree of 18. The extract had a pH of 4.86 and contained chlorogenic acids in an amount of 273 mg/100 mL and chlorogenic acid lactones in an amount of 26 mg/100 mL.

Comparative Example 4

Alkali Treatment

The raw-material roasted coffee bean extract (3) (100 mL) obtained in Production Example 3 was adjusted with ion exchange water so as to have a Brix degree of 8.5. At this time, the content of chlorogenic acids in the raw-material roasted coffee bean extract was 119 mg/100 mL, the content of chlorogenic acid lactones was 11.3 mg/100 mL, and the content of dicaffeoylquinic acids ($A^1$) in (A) was 1.9 mass %. This solution was treated with a 1 M aqueous solution of potassium hydroxide while stirring for one hour at 25° C. such that the pH was maintained at 11. Then, to the solution, 85% phosphoric acid was added to adjust the pH to 4.8 to obtain a roasted coffee bean extract. The analysis results of the obtained roasted coffee bean extract are shown in Table 1.

Comparative Example 5

Enzymatic Treatment

The raw-material roasted coffee bean extract (3) (100 mL) obtained in Production Example 3 was adjusted with ion exchange water so as to have a Brix degree of 2.9. At this time, the content of chlorogenic acids in the raw-material roasted coffee bean extract was 43 mg/100 mL, the content of chlorogenic acid lactones was 4.5 mg/100 mL, and the content of dicaffeoylquinic acids ($A^1$) in (A) was 1.9 mass %. The solution was adjusted so as to have a pH of 4.8. To this solution, a hydrolysis enzyme, esterase (Cellulosin GM5 (HBI Enzymes Inc.), 1 U/mg coffee solid content), was added and the mixture was poured in a screw tube. The screw tube was stirred in a water cistern at 40° C. (100 rpm). After a reaction was performed for two hours, the screw tube was taken out to obtain a roasted coffee bean extract. The analysis results of the obtained roasted coffee bean extract are shown in Table 1.

extract within appropriate ranges and subjecting the extract to heat treatment at 100° C. or more, and that a roasted coffee bean extract suppressed in bitterness can be obtained without reducing the contents of chlorogenic acids and dicaffeoylquinic acids compared to a conventional method.

The invention claimed is:

1. A roasted coffee bean extract comprising components (A) and (B):
   chlorogenic acids (A); and
   chlorogenic acid lactones (B),
   wherein a weight ratio (A)/(B) of the chlorogenic acids (A) to the chlorogenic acid lactones (B) is from 45 to 100000,
   a content of the dicaffeoylquinic acids ($A^1$) in the chlorogenic acid (A) is from 3 to 13 mass %, and
   a Brix degree is from 10 to 40.

2. The roasted coffee bean extract according to claim 1, wherein a content of the chlorogenic acids (A) is from 0.1 to 12 mass %.

TABLE 1

| | | Example | | | | | | Comparative Example | | | | |
|---|---|---|---|---|---|---|---|---|---|---|---|---|
| | | 1 | 2 | 3 | 4 | 5 | 6 | 1 | 2 | 3 | 4 | 5 |
| Before treatment | Type of raw-material roasted coffee bean extract | (1) | (1) | (1) | (2) | (2) | (2) | (1) | (1) | (1) | (3) | (3) |
| | Brix degree (20° C.) | 13 | 13 | 13 | 13 | 24 | 30 | 13 | 13 | 4 | 8.5 | 2.9 |
| | pH (20° C.) | 5.5 | 6.2 | 6.2 | 5.7 | 5.7 | 5.7 | 4.7 | 6.2 | 5.5 | 11 | 4.8 |
| | Content of chlorogenic acids (A) (mass %) | 1.157 | 1.157 | 1.157 | 1.429 | 2.722 | 3.437 | 1.157 | 1.157 | 0.362 | 0.119 | 0.043 |
| | Content of dicaffeoylquinic acids ($A^1$) in (A) (mass %) | 4.9 | 4.9 | 4.9 | 9.6 | 9.6 | 9.6 | 4.9 | 4.9 | 5.2 | 1.9 | 1.9 |
| | Content of chlorogenic acid lactones (B) ($\times 10^{-3}$ mass %) | 39.0 | 39.0 | 39.0 | 30.8 | 58.3 | 70.4 | 39.0 | 39.0 | 12.0 | 11.3 | 4.5 |
| Heating treatment condition | Type of treatment | Heating | Heating | Heating | Heating | Heating | Heating | Heating | Heating | Heating | Alkali | Enzyme |
| | Temperature (° C.) | 105 | 105 | 120 | 120 | 120 | 120 | 105 | 80 | 105 | Room temperature | 40 |
| | Pressure (absolute pressure) (kPa) | 220 | 220 | 290 | 290 | 290 | 290 | 220 | 149 | 220 | 101 | 109 |
| | Treatment time (min) | 20 | 20 | 20 | 5 | 20 | 20 | 20 | 20 | 20 | 60 | 120 |
| After treatment | Brix degree (20° C.) | 13 | 13 | 14 | 13 | 24 | 31 | 13 | 14 | 4 | 8.5 | 2.9 |
| | pH (20° C.) | 5.3 | 5.9 | 5.7 | 5.4 | 5.4 | 5.4 | 4.5 | 6.2 | 5.3 | 4.8 | 4.8 |
| | Content of chlorogenic acids (A) (mass %) | 1.155 | 1.158 | 1.108 | 1.389 | 2.636 | 3.320 | 1.147 | 1.147 | 0.364 | 0.117 | 0.019 |
| | Content of dicaffeoylquinic acids ($A^1$) in (A) (mass %) | 4.7 | 4.5 | 4.3 | 7.2 | 8.9 | 8.9 | 4.8 | 4.9 | 4.3 | 1.4 | 0.5 |
| | Content of chlorogenic acid lactones (B) ($\times 10^{-3}$ mass %) | 22.7 | 11.4 | 4.2 | 13.5 | 17.4 | 16.7 | 33.6 | 34.3 | 9.3 | 2.7 | 0.9 |
| | Mass ratio (A)/(B) | 50.9 | 101.6 | 263.7 | 102.9 | 151.5 | 198.8 | 34.1 | 33.4 | 39.1 | 43.1 | 21.4 |
| | Mass ratio of treated chlorogenic acids (A) to untreated chlorogenic acids (A) | 1.00 | 1.00 | 0.96 | 0.97 | 0.97 | 0.97 | 0.99 | 0.99 | 1.00 | 0.98 | 0.45 |
| | Mass ratio of treated chlorogenic acid lactones (B) to untreated chlorogenic acid lactones (B) | 0.58 | 0.29 | 0.11 | 0.44 | 0.30 | 0.24 | 0.86 | 0.88 | 0.78 | 0.24 | 0.20 |
| | Content of chlorogenic acids in solids content (mass %) | 8.7 | 8.6 | 8.2 | 10.5 | 11.0 | 10.7 | 8.8 | 8.5 | 8.7 | 1.4 | 0.7 |
| Evaluation | Bitterness | 3.0 | 3.3 | 4.0 | 3.7 | 3.7 | 4.0 | 1.0 | 1.0 | 1.0 | 2.0 | 1.0 |
| | Deterioration smell | 4 | 4 | 4 | 4 | 4 | 4 | 4 | 4 | 4 | 1 | 2 |
| | Taste balance between acidity and rich taste | 3 | 3 | 3 | 4 | 4 | 5 | 2 | 2 | 2 | 1 | 1 |

From the results of Table 1, it was found that chlorogenic acid lactones can be selectively removed by adjusting the Brix degree and the pH of a raw-material roasted coffee bean 3. The roasted coffee bean extract according to claim 1, wherein a content of the chlorogenic acids (A) in solids is from 5 to 30 mass %.

4. The roasted coffee bean extract according to claim 1, wherein the content of the dicaffeoylquinic acids ($A^1$) in the chlorogenic acids (A) is from 5 to 11 mass %.

5. The roasted coffee bean extract according to claim 3, wherein the content of the dicaffeoylquinic acids ($A^1$) in the chlorogenic acids (A) is from 5 to 11 mass %.

6. An instant coffee obtained by drying the roasted coffee bean extract according to claim 1.

7. An instant coffee obtained by drying the roasted coffee bean extract according to claim 5.

8. A concentrated coffee composition obtained by concentrating the roasted coffee bean extract according to claim 1.

9. A concentrated coffee composition obtained by concentrating the roasted coffee bean extract according to claim 5.

10. A packaged coffee beverage obtained by charging a contianer with the roasted coffee bean extract according to claim 1.

11. The packaged coffee beverage according to claim 10, wherein a content of the chlorogenic acids (A) in the beverage is from 0.01 to 8 mass %.

\* \* \* \* \*